US012499867B2

United States Patent
Bastyr et al.

(10) Patent No.: US 12,499,867 B2
(45) Date of Patent: Dec. 16, 2025

(54) APPARATUS, SYSTEM, AND METHOD FOR PROVIDING A FAST-ACTING ENGINE ORDER CANCELLATION

(71) Applicant: Harman International Industries, Incorporated, Stamford, CT (US)

(72) Inventors: Kevin J. Bastyr, Franklin, MI (US); James May, Milford, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 423 days.

(21) Appl. No.: 18/085,175

(22) Filed: Dec. 20, 2022

(65) Prior Publication Data

US 2024/0203395 A1 Jun. 20, 2024

(51) Int. Cl.
*G10K 11/178* (2006.01)

(52) U.S. Cl.
CPC .. *G10K 11/17883* (2018.01); *G10K 11/17854* (2018.01)

(58) Field of Classification Search
CPC ......... G10K 11/17821; G10K 11/1783; G10K 11/17855; G10K 11/17854; G10K 11/17883; G10K 2210/1282; G10K 2210/3033; G10K 2210/511; G10K 2210/501
See application file for complete search history.

(56) References Cited

U.S. PATENT DOCUMENTS

2008/0192948 A1 8/2008 Kan et al.
2015/0063582 A1 3/2015 Pan

FOREIGN PATENT DOCUMENTS

JP H0411293 A 1/1992
JP 2008002318 A 1/2008

OTHER PUBLICATIONS

Extended European Search Report dated May 17, 2024 for European Patent Application No. 23214609.2, 13 pages.

*Primary Examiner* — Kile O Blair
(74) *Attorney, Agent, or Firm* — BROOKS KUSHMAN P.C.

(57) ABSTRACT

In at least one embodiment, an active noise cancellation (ANC) system is provided. The ANC system includes at least one loudspeaker, at least one microphone and at least one controller. The at least one loudspeaker projects anti-noise sound within a cabin of a vehicle based at least on an anti-noise signal. The at least one microphone provides an error signal indicative of noise and the anti-noise sound within the cabin. The at least one controller is programmed to receive the error signal and a reference signal indicative of a gear shift that occurs over a predetermined time interval and to adapt at least one adaptive filter with pre-stored filter coefficients for the predetermined time interval to generate the anti-noise signal based at least on the error signal and the reference signal.

20 Claims, 3 Drawing Sheets

APPARATUS, SYSTEM, AND METHOD FOR PROVIDING A FAST-ACTING ENGINE ORDER CANCELLATION

TECHNICAL FIELD

The present disclosure is generally directed to an apparatus, system and/or method for providing a fast-acting engine order cancellation (EOC). For example, the apparatus, system and the method provide for fast-acting engine order cancellation (EOC) after gear shifts and/or for dynamic skip fire engines. These aspects and others will be discussed in more detail herein.

BACKGROUND

Active Noise Cancellation (ANC) systems attenuate undesired noise using feedforward and/or feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, combine to reduce the sound pressure level (SPL) at a location. In a vehicle cabin listening environment, potential sources of undesired noise are the engine, the exhaust system, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

An Engine Order Cancellation (EOC) system is a specific ANC system implemented on a vehicle in order to minimize undesirable engine and exhaust system noise inside the vehicle cabin. EOC systems use a non-acoustic sensor, such as an engine speed sensor, to generate a reference signal representative of the engine crankshaft rotational speed in revolutions-per-minute (RPM) as a reference. This reference signal is used to generate sound waves that are opposite in phase to the engine and exhaust noise that is audible in the vehicle interior.

Originally, ANC systems used analog signal processing techniques. Typically though, ANC systems use digital signal processing and digital filtering techniques. For example, either the aforementioned non-acoustic sensor or a noise sensor such as a microphone, obtains an electrical reference signal representing a disturbing noise signal generated by a noise source. This reference signal is fed to an adaptive filter. The filtered reference signal is then supplied to an acoustic actuator, for example, a loudspeaker, which generates a compensating sound field, which ideally has an identical magnitude an opposite phase to the noise signal. This compensating sound field eliminates, or reduces, the noise signal within the listening environment.

A residual noise signal (i.e., a signal resulting from the combination of the noise field and antinoise field at a location) may be measured, using a microphone, to provide an error signal to the adaptive filter, where the filter coefficients (also called parameters) of the adaptive filter are modified to minimize the error signal, thereby maximizing the noise cancellation performance. The adaptive filter may use digital signal processing methods, such as least means square (LMS) to reduce the error signal.

An estimated model that represents an acoustic transmission path from the loudspeaker to the microphone is used when applying the FxLMS or MFxLMS algorithm. This acoustic transmission path is usually referred to as the secondary path of the ANC system. In contrast, the acoustic transmission path from the noise source to the error sensor is usually referred to as the primary path of the ANC system.

EOC as employed with ANC systems is generally configured to continuously adapt a W-filter (or adaptive filter) for individual engine orders using only a rotations per minute (RPM) signal and signals provided from error microphones as guiding signals. However, at the time of a vehicle gear shift, there is a large change in RPM, which takes the EOC system time to adapt its W-filter(s) to deliver a satisfying noise cancellation experience to the listeners of the EOC system.

SUMMARY

In at least one embodiment, an active noise cancellation (ANC) system is provided. The ANC system includes at least one loudspeaker, at least one microphone and at least one controller. The at least one loudspeaker projects anti-noise sound within a cabin of a vehicle based at least on an anti-noise signal. The at least one microphone provides an error signal indicative of noise and the anti-noise sound within the cabin. The at least one controller is programmed to receive the error signal and a reference signal indicative of a gear shift that occurs over a predetermined time interval and to adapt at least one adaptive filter with pre-stored filter coefficients for the predetermined time interval to generate the anti-noise signal based at least on the error signal and the reference signal.

In at least another embodiment, a method for performing active noise cancellation (ANC) is provided. The method includes transmitting anti-noise sound within a cabin of a vehicle based at least on an anti-noise signal and providing an error signal indicative of noise and the anti-noise sound within the cabin. The method further includes receiving, by at least one controller, the error signal and a reference signal indicative of a gear shift change that occurs over a predetermined time interval and adapting at least one adaptive filter, via the at least one controller, with pre-stored filter coefficients for the predetermined time interval to generate the anti-noise signal based at least on the error signal and the reference signal.

In at least another embodiment, a computer-program product embodied in a non-transitory computer readable medium that is programmed for performing active noise cancellation (ANC) is provided. The computer-program product comprising instructions being executable by at least one controller to transmit anti-noise sound within a cabin of a vehicle based at least on an anti-noise signal and to provide an error signal indicative of noise and the anti-noise sound within the cabin. The computer program product comprising instructions being executable by the at least one controller to receive the error signal and a reference signal indicative of a gear shift change that occurs over a predetermined time interval and to adapt at least one adaptive filter, via the at least one controller, with pre-stored filter coefficients for the predetermined time interval to generate the anti-noise signal based at least on the error signal and the reference signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
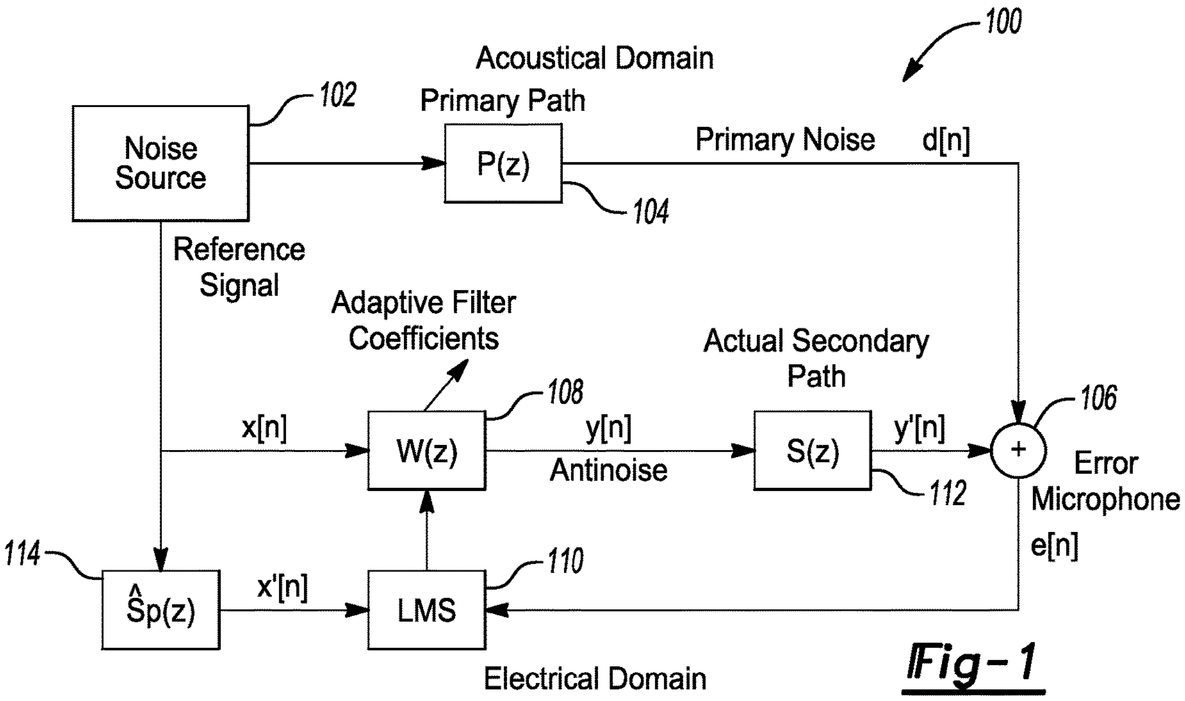
FIG. 1 depicts one example of an active noise cancellation (ANC) system in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In one example, an EOC based system utilizes a reference signal, which is an analog or a digital RPM signal, and synthesizes a suite of sine wave signals. One signal at each engine order frequency to be canceled or reduced in amplitude. In another EOC system, no special care may be taken in the case where a gear shift changes the engine RPM over a period of, for example 50 ms to 400 ms. Fortunately, during the period of the gear shift, the engine torque drops, meaning that the engine noise is also lower during the period of the shift. Unfortunately, in the instant after the shift, when engine torque increases (e.g., as the vehicle accelerates), the EOC system has not yet converged due to the rapidly changing RPM during the shift. The W-filters (or adaptive filters) for each engine order may be continuously adapted, meaning they are essentially "pre-seeded" with their magnitude and phase values from the frequency of that order before the shift. The magnitude and phase of the ideal W-filter for each engine order before and after a gear shift may not be related in any way, due to the large RPM delta (~2000 RPM) between those two states. The disclosed apparatus, system, and method provides, among other things, a pre-characterization of the magnitude and phase of each W-filter at each engine order for each RPM and may generate a lookup table ("LUT") needed to "pre-seed" the magnitude and phase of each W-filter for use during and just after a gear shift. One enabler of "pre-seeding" the phase information may include, but not limited to, is an absolute phase reference provided by "missing tooth" of an analog RPM crank signal that is often seen as a nuisance in current EOC systems. The disclosed embodiments provide a "pre-seeding" method that may enable EOC to converge to an ideal W-filter magnitude and phase much faster than the EOC system can practicing the aspect of continuously adapting from the pre-gear shift magnitude and phase. Naturally, faster adaptation after a gear shift may improve the user experience in the vehicle by quieting the engine noise during a period when the engine noise is typically the highest (e.g., when gear shifts are required by the engine thereby enabling faster acceleration). Faster adaptation after a shift may also address a known deficiency in Filtered x-Least Mean Square (FXLMS) or a Modified Filtered-x LMS (MFxLMS) algorithm adaptive systems used for EOC systems.

The aspects disclosed herein may also be applicable to any engines using cylinder deactivation, and even dynamic skip fire engines, which rapidly change cylinder firing number and order in an effort to achieve fuel savings. Similar to gear shifts, in the moments after cylinder deactivation or reactivation events, the dominant engine orders created change in amplitude very rapidly. In many cases, the engine order frequencies dominant in one firing configuration may be quite different than the dominant engine orders in a second firing configuration. Naturally, this may result in a large difference in the magnitude and phase of engine order W-filter values between the pre and post cylinder firing number change, thereby delaying ideal EOC by the need to adapt. This adaptation delay can be shortened by "pre-seeding" new magnitude and phase values that were pre-stored in the LUT for this engine type, thereby quieting the engine noise more rapidly or even nearly instantaneously, which improves the user experience.

In general, with EOC systems, there is a need to continuously adapt the individual engine order's W-filters using only the RPM signal (and the error microphones) as guiding signals. As noted above, at the time of a gear shift, there is a large change in RPM, which takes the EOC system some time to adapt to. In this regard, it is recognized that it is possible to speed the convergence at the time of a gear shift, thereby improving the noise cancellation. The present disclosure provides, among other things, "seeding" a new value for a magnitude and phase of an adaptive filter based on data stored in an amplifier or in memory elsewhere. Such data may be based from a pre-characterization of the vehicle's engine and drivetrain. This pre-characterization requires an absolute phase reference that is provided by a "missing tooth" of an analog RPM signal that is present in existing EOC systems.

For an EOC system, at the time of a gear shift, there is a large change in the engine's revolutions per minute (RPM) which takes the EOC system some time to adapt to. Various original equipment manufacturers have been requesting a faster adapting EOC system after gear shifts from EOC system providers for some time. In an example, a vehicle's drivetrain may exhibit a 160-180 Hz loud 4th order resonance. When a shift event occurs, and the post-shift RPM lands in this resonance band of the exhaust of the vehicle, the EOC system must adapt the W-filter magnitude of an adaptive filter to be much higher than the pre-shift value in a very short period of time—in order to cancel this especially high amplitude noise. The ability to retrieve and use a "pre-seeding" value of W-filter magnitude and phase as now set forth herein results in higher w-filter magnitude that may dramatically shorten convergence time. This results in, but not limited to, the engine/exhaust noise cancellation performance improving sooner after a shift. This condition is desirable by both vehicle occupants and OEMs.

For background, a least mean square, LMS, algorithm is used to adapt the W-filters. This algorithm may be implemented, for example, using digital signal processors. The LMS algorithm is based on a method of the steepest descent and computes a gradient in a simple manner. The algorithm operates in a time-recursive fashion.

Figure 2:
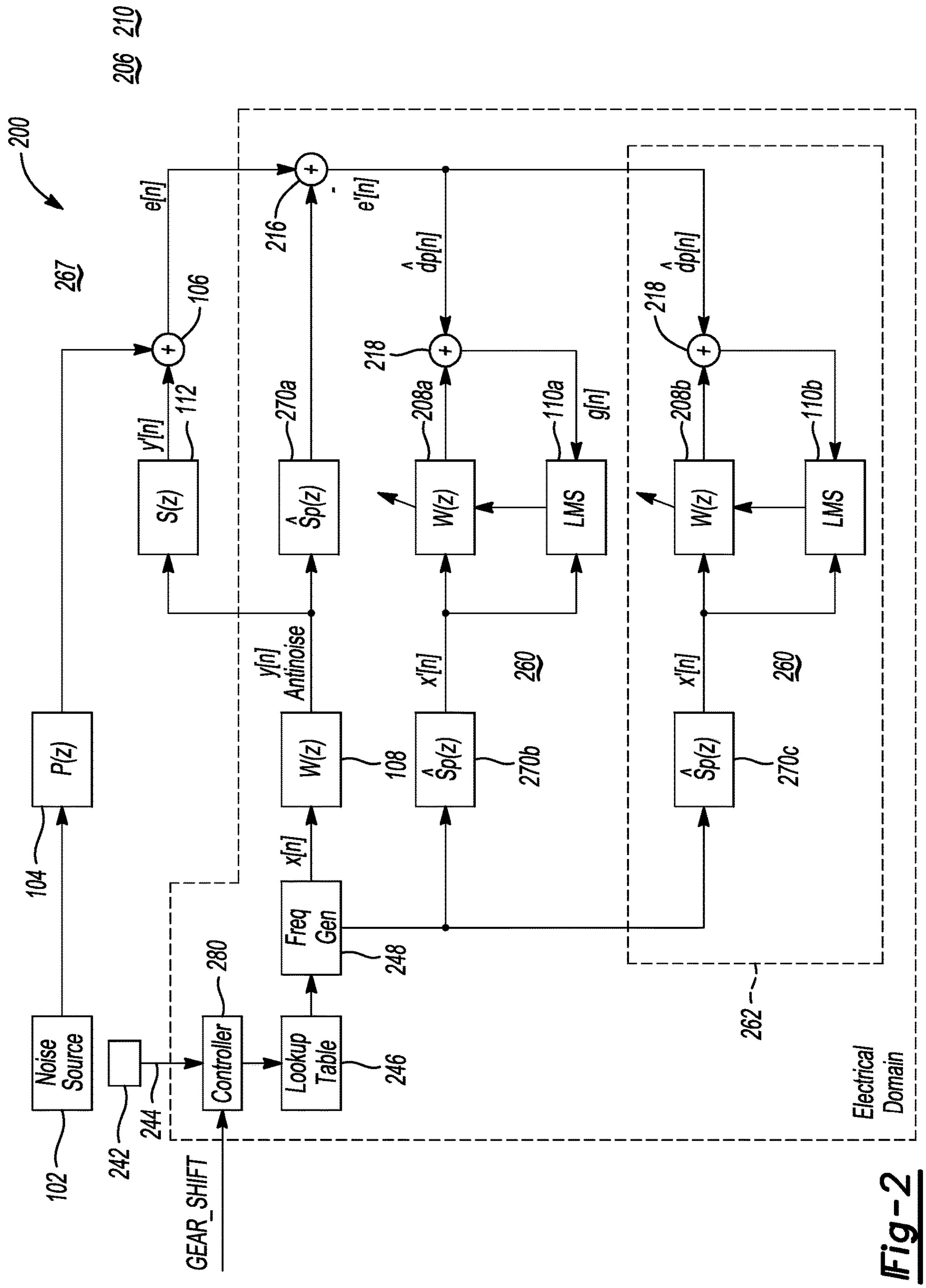
FIG. 2 depicts a block diagram of an ANC system including an engine order cancellation (EOC) system in accordance with one embodiment.

The ANC system may use a FxLMS algorithm (see FIG. 1), or modifications or extensions thereof such as the LMS system, or the MFxLMS algorithm (see FIG. 2). In FIG. 1, the elements are divided between an acoustical domain and an electrical domain. Also, each system may be a scalable, multiple-input-multiple-output (MIMO) system that operates for multiple speaker outputs, multiple error microphones, and multiple engine orders, in the case of a listening environment that is a vehicle cabin. However, for simplicity in describing one or more of the aspects disclosed herein, its recognized that the disclosed system(s) hereinafter includes one speaker, one error signal, and one reference signal. It is recognized that various embodiments can include any number of speakers, microphones, and reference signals.

FIG. 1 is directed to FxLMS, wherein a digital feedforward ANC system 100 includes a noise source 102 and a primary noise signal, d[n], that passes through a filter 104 having a primary path transfer function, P(z). P(z) represents the transfer characteristics of a signal path between the noise source 102 and an error microphone 106. An adaptive filter 108 has a transfer function, W(z), having an adaptation unit 110 that calculates a set of filter coefficients (also called parameters) for the adaptive filter 108. An actual secondary path system 112 has a transfer function, S(z), downstream of the adaptive filter 108. The transfer function, S(z), represents a signal path between a loudspeaker that radiates a compensation signal and a position in the listening environment such as the error microphone 106. Transfer function S(z) includes the transfer characteristics of all components downstream of the adaptive filter 108, including, for example, the amplifier, digital-to-analog converter, the loudspeaker, acoustic transmission path, microphone, and analog-digital converter. An electrical anti-noise signal, y[n], is sent to the speaker. An estimated secondary path system 114, has a transfer function $\hat{S}_p(z)$, which is an estimate of the actual secondary path transfer function S(z), and is used by the adaptation unit 110 to calculate the filter coefficients of the transfer function for the adaptive filter 108. The primary path filter 104 and the actual secondary path filter 112 represent the physical properties of the listening environment. The transfer functions W(z), and $\hat{S}_p(z)$ are often implemented in a digital signal processor.

Noise source 102 provides a signal to the primary path filter 104 which provides a disturbing noise signal, d[n], to the error microphone 106. A reference signal, x[n] related to noise source 102 is provided to the adaptive filter 108, which imposes a magnitude change and phase shift and outputs a filtered anti-noise signal y[n] to the speaker, which is part of the actual secondary path transfer function 112 which outputs a signal, y'[n], that destructively combines with the primary noise signal d[n]. The reference signal, x[n], may be derived from a source that is correlated with the primary noise source 102, such as engine RPM, a microphone or accelerometers. A measurable residual signal represents an error signal, such as the output of a microphone, e[n], for the adaptation unit 110. The estimated secondary path transfer function $\hat{S}_p(z)$ is used by LMS block 110 to calculate updated filter coefficients. This compensates for the difference between the anti-noise signal y[n] and a filtered anti-noise signal, y'[n], due to the delay and also the frequency dependent magnitude and phase change from the secondary path. The secondary path transfer function $\hat{S}_p(z)$ also receives the reference signal, x[n], from the noise source 102 and provides a filtered reference signal x'[n] to the adaptation unit 110, which is the basis of the term filtered-x in FXLMS.

FIG. 2 is a modified filtered-x LMS (MFxLMS) feedforward noise cancellation system 200. The noise cancellation system 200 includes various aspects as set forth in FIG. 1 and share similar references numerals as set forth in FIG. 1 (e.g., the noise source 102, the primary path 104 (i.e., P(z)), the error microphone 106, the adaptive filter 108 and the secondary path 112 (i.e., S(z)). The system 200 includes an engine order cancellation (EOC) system 206. In an embodiment, the MFxLMS EOC system 206 shown in FIG. 2 includes adaptive filters 208*a*-208*b*, a loudspeaker 210, an engine speed sensor 242, a look up table (LUT) 246, a frequency generator 248, and may include an additional shadow filter 262, a plurality of estimated secondary path filters 270*a*-270*c* (or ($\hat{S}_p(z)$), a plurality of LMS adaptation units 110*a*-110*b* and at least one controller 280 (hereafter "the controller 280"). The reference signal x[n] is filtered by a first estimated secondary path filter 270*a* ($\hat{S}_p(z)$) and the adaptive filter 108 having transfer function W(z). Coefficients of the first estimated secondary path filter 270*a* are referred to as active filter coefficients. The manner in which the reference signal x [n] is generated will be discussed in more detail below. The second adaptive filter 208*b* filters the filtered reference signal x'[n] with a transfer function W(z) to generate the anti-noise signal y[n]. The anti-noise signal y[n] is sent to the loudspeaker 210 and so is filtered by the actual secondary path transfer function S(z) or 112. The signal y'[n] is audible anti-noise at the error microphone 106 as filtered by the actual secondary path transfer function S(z), 112. The filtered anti-noise signal y'[n] is combined at the error microphone 106 with primary noise d[n] as filtered by the actual primary path transfer function P(z) 104.

In the electrical domain, the anti-noise signal y[n] is filtered by a second secondary path transfer characteristic $\hat{S}_p(z)$ 270*a* to form e'[n] and is subtracted from the error signal, e[n], at adder 216 (or microphone). This results in an estimated noise signal, $\hat{d}_p[n]$, at the error microphone 218. The estimated noise signal $\hat{d}_p[n]$ is combined with the signal filtered by the first adaptive filter 208*a* at adder 218 to generate an internal error signal g[n]. The internal error signal g[n] is an input to the adaptation unit 110*b*. The adaptation unit 110*a* uses the filtered x'[n] signal and the internal error signal g[n] to adapt the W-filter 208*a*. At predetermined intervals the W-filter 208*a* is copied into filter 108, to become the active W-filter. The engine speed sensor 242 provides a reference signal such as an engine speed signal 244 (e.g., a square-wave signal) indicative of rotation of an engine crank shaft or other rotating shaft such as the drive shaft, half shafts or other shafts whose rotational rate is aligned with vibrations coupled to vehicle components that lead to narrow-band noise in the passenger cabin. In an embodiment, EOC system 206 includes an additional shadow filter 262. The function of this filter is to "pre-adapt" a second W-filter 208*b* that can optionally be copied to the active W-filter 108. This second W-filter (or the W-filter 208*b*) can be adapted using the same or different coefficients and parameters in elements 270*b*, 110*b* or 208*b*. For example, the shadow filter 262 may include a different secondary path 270*c*, a different set of LMS system parameters 110, which could include a different step size, etc, or it may be seeded with a different w-filter magnitude or phase information.

In some embodiments, the engine speed signal 244 may be obtained from a vehicle network bus (not shown). As the radiated engine orders are directly proportional to the crank shaft RPM, the engine speed signal 244 is representative of the frequencies produced by the engine and exhaust system and may be obtained from a processed microphone signal from a microphone located in either of these two areas (e.g., engine or exhaust system) (not shown). Thus, the signal from the engine speed sensor 242 may be used to generate reference engine order signals corresponding to each of the engine orders for the vehicle. Accordingly, the engine speed signal 244 may be used in conjunction with the LUT 246 based on Engine Speed (RPM) vs. Engine Order Frequency, which provides a list of engine orders radiated at each engine speed. The frequency generator 248 may take as an input the Engine Speed (RPM) and generate a sine wave for each order to be cancelled, based on the LUT 246. In various embodiments, the LUT 246 may include data for some to all of the engine order orders.

This sine wave as generated by the frequency generator 248 is the noise signal X(n) indicative of engine order noise for a given engine order. The noise signal X(n) from the frequency generator 248 is sent to an adaptive controllable filter 108, or W-filter, which provides a corresponding anti-noise signal Y(n) to the loudspeaker 210. The anti-noise signal Y(n), broadcast by the loudspeaker 210 generates anti-noise that is ideally out of phase but identical in magnitude to the actual engine order noise at the location of a listener's ear, which may be in close proximity to the physical microphone 106, thereby dramatically reducing the sound amplitude of the engine order. Because engine order noise is narrow band, the error signal e(n) may be optionally filtered by a bandpass filter (not shown). The controller 280 may include the lookup table 246, one or more frequency generators 248, one or more adaptive filters 108, 208 and one or more adaptive filter controllers 110*a*,110*b*.

In order to simultaneously reduce the amplitude of multiple engine orders, the EOC system 206 may include multiple frequency generators 248, one for generating the noise signal X(n) for each engine order based on the engine speed signal 244. As an example, FIG. 2 shows a one order EOC system 206 having one such frequency generator for generating a noise signal. If the EOC system 206 was expanded to cancel two engine orders, then two frequency generators 248 may generate unique noise signals (e.g., $X_1(n)$, $X_2(n)$, etc.) for each engine order based on engine speed. Because the frequency of the two engine orders differ, optional bandpass filters (not shown) would have different high- and low-pass filter corner frequencies. The number of frequency generators and corresponding noise-cancellation components will vary based on the number of engine orders to be cancelled for a particular engine and exhaust system of the vehicle. The anti-noise signals $Y_1(n)$ and $Y_2(n)$ output from the two controllable filters are simply summed and sent to the loudspeaker 210 as a loudspeaker signal Si(n). Similarly, the error signal e(n) from the physical microphone 208 may be sent to the two LMS adaptive filter controllers. Alternate embodiments include multiple speakers, and/or multiple error microphones 106.

As noted above, the EOC system 206 takes in a reference signal (or the reference engine order signal as generated by the engine speed sensor 242), which is an analog or digital RPM signal, and synthesizes a suite of sine waves, one at each engine order frequency to be canceled or reduced in amplitude. Conventional EOC systems fail to, among other things, take into account the moment in which a gear shift changes the engine RPM which takes between, for example, 50 ms for extremely high-performance vehicles with "fast" transmissions (i.e., Corvettes, SRT's), to 150 ms for more a high-performance transmission, up to as high as 500 ms or more for a vehicle with average performance. It is interesting to note that all the gear ratios of transmissions may be known. This aspect illustrates that the approximate engine order frequency after the shift is essentially known before the shift even starts. In general, aspects disclosed herein may require an additional step that is added to the tuning process, which is to characterize the engine order amplitude and phase as a function of RPM in each gear. These values (or W-filter values based on the engine order amplitude and phase) are stored in a table.

A noise cancellation system termed an "EOC system" may cancel any narrow band noise source in a vehicle that are related to the rotational rate of a shaft. Most typically, these systems cancel the noise of an engine and an exhaust system, and so a relevant reference signal 244 is that of the rotational rate of the crank shaft. However, a noise cancellation system of the similar topology to the EOC system may also cancel other narrow band noises, such as those form the rotational imbalance of other shafts, such as the drive shaft, half shafts or other shafts that lead to narrow-band noise in the passenger cabin. To cancel these other noises, a rotational sensor must be placed on these shafts, or the various gear ratios must be known relative to a second shaft that is instrumented with a sensor.

In various embodiments, the engine speed sensor 242 may be implemented in as any number of sensor types. Such an engine speed sensor 242 may be known by alternate names and may be mounted in a variety of positions. Various examples include a crankshaft position sensor (or "CKP sensor") 242 which may be mounted to the engine cylinder block, or drive line sensor which may be mounted near the transmission bell housing, or the like. Two common sensor types include magnetic sensors with a pickup coil that produces an AC voltage, and a hall effect sensor that produces a digital square wave output signal based on teeth on the reluctor ring. In this regard, the system 200 includes a crank position sensor 242 that generates, for example, the reference signal 244 (or the crank pulse signal 244) which may be in the form of a square wave output as the engine rotates, thereby outputting 60−2=58 square wave pulses per revolution. This is because there is often a "missing tooth" or two "missing teeth" in the reluctor ring sensed by the crank pulse sensor 242.

The controller 280 receives the crank pulse signal and detects the missing teeth on the crank pulse signal. In current implementations, controllers have been implemented which generally requires some additional lines of code to detect and re-synthesize a guiding signal that does not have this non-uniformity caused by the missing tooth or teeth. The signal from the engine speed sensor 242 (or the CKP 242) is used to generate reference engine order signals corresponding to each of the engine orders for the vehicle. To do this, the CPK/RPM signal is used in conjunction with a lookup table RPM vs. Engine Order Frequency. The frequency of a given engine order at the sensed RPM, as retrieved from the lookup table and is input into to a sine wave oscillator thereby generating a sine wave at the given frequency. This sine wave is the reference signal for the adaptive LMS system. There is one sine wave generator creating one reference signal for each engine order to be canceled by the EOC system.

In general, the missing tooth characteristic on the crank pulse signal may have been treated as a negative feature that required correction in prior EOC systems. However, it is recognized that such a feature may be used to some benefit and serve as a phase reference for the EOC system 206, such that when a vehicle gear shift changes the engine's RPM over a predetermined time interval (e.g., 50 to 400 ms). In general, the phase of the W-filters or the adaptive filters 108 and 208 may be relative to the RPM signal. In this case, another LUT 260 is provided that includes a magnitude and corresponding phase (relative to this CKP signal or RPM signal) to be used by the filter controllers 110 to seed the adaptive filters 208*a*, 208*b* during moments in which the gear shift causes the engine's RPM to increase (or decrease) over the predetermined time interval. This aspect enables the EOC system 206 to converge quicker both during the gear shift and after the gear shift. The LUT 260 generally provides a corresponding magnitude and corresponding phase for each adaptive filter 108 and 208 for every engine order to be cancelled. It is recognized that the LUTs 246 and 260 are generally stored in memory 267. The controller 280 may be operably coupled to the memory 267 to access the LUTs 246 and 260. In an embodiment, the LUT 246 may be combined with LUT 260.

To understand the relevance of the missing tooth characteristic of the crank pulse signal, one may look to the operation of engines generally and understand how the cylinder firing timing is related to the crank shaft rotation. For example, an engine rotating at a rate of 1800 RPM may be said to be running at 30 Hz (1800/60=30), which corresponds to a fundamental or primary engine order frequency. For a four-cylinder engine, two cylinders are fired during each crank revolution, resulting in the 60-Hz (30×2=60) dominant frequency that defines the four-cylinder engine's sound at 1800 RPM. With the four-cylinder engine, this may also be called the "second engine order" because the frequency is two times that of the engine's rotational rate. At 1800 RPM, other dominant engine orders of a four-cylinder engine are the 4th order, at 120 Hz, and the 6th order, at 180 Hz. In a six-cylinder engine, the firing frequency results in a dominant third engine order; for a V-10, the dominant is the fifth engine order.

In general, for a four-cylinder engine, two cylinders are fired during each crank revolution. That entails that the timing of the cylinder firing is synchronous to the crank shaft rotation. An acoustic pressure maximum may be linked to the cylinder firing event (e.g., the cylinder firing creates the sound after all). Thus, there may be a phase relationship between the acoustic pressure maximum created when the cylinders fire and the "missing tooth" on the crank pulse signal (or crank shaft RPM sensor signal). Because these are phase related, it is possible to "pre-characterize" the engine, and store a post-shift phase of the W-filters (the adaptive filters 208*a*-208*b*) for use later. In general, the post shift phase may be relative to a phase of the "missing tooth" on the RPM signal, which is not currently used in prior EOC system. Thus, one aspect for the pre-characterization as disclosed herein is a feature that was formerly seen as a nuisance (e.g., the missing "tooth" of the analog RPM signal). Stated differently, the "missing tooth" on the crank pulse signal provides an absolute phase reference which thereby links the cylinder firing and the error mic pressure maxima that allows storing of a phase for the W-filter 208.

The EOC system 206 generally requires, among other things, the detection of a gear shift, the determination of a reliable and stable post-shift RPM, and then the utilization of the LUT 260 to retrieve stored "or pre-characterized" phase and magnitude values associated with RPM and engine order.

In an embodiment, a trigger to identify a gear shift can be a multiplexed data communication signal such as for example, a Controller Area Network (CAN) signal. In this case, the CAN signal provides information corresponding to the engine undergoing a gear shift. In reference to the EOC system 206, the controller 280 may receive a signal GEAR_SHIFT from another controller positioned in the vehicle (e.g., power train control module).

As noted above, prior to utilizing the magnitude and phase from the LUT 260 for application to the adaptive filters 108 and 208, it is necessary to detect a gear shift. As previously mentioned, a gear shift is a sudden (e.g., a 50 ms to 400 ms) step change (often in excess of 1000 RPM) in engine RPM either upward (i.e., for a downshift, which is a shift to a lower gear) or downward (for an upshift, which is a shift to a higher gear) direction. Methods of detecting a gear shift may include any method to detect a sudden shift in the RPM signal beyond a predetermined threshold in RPM over a predetermined time period. In general, when an engine is operated at a "constant RPM" or when the vehicle is traveling at "constant speed", the RPM signal may not have a numerically constant value. Instead, the engine RPM signal, which is often updated on the CAN bus, for example, every 15 ms, may exhibit several percent of variation over a period of 400 ms. This variation may appear to be a type of "noise" on the signal. Therefore, some averaging may be needed to form an accurate estimation of the current engine RPM.

Figure 3A:
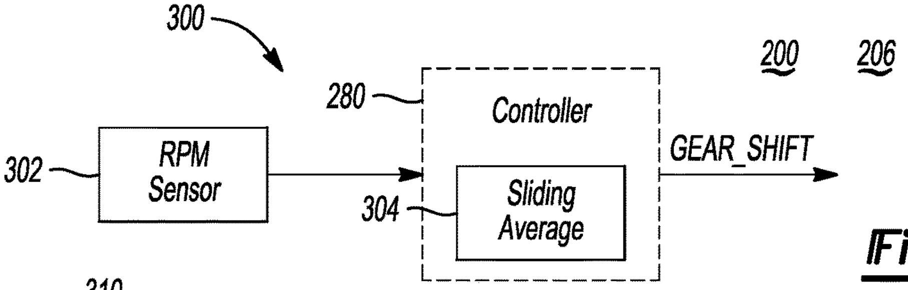
FIGS. 3A-3C depict various block diagrams of apparatuses for detecting shift events in a vehicle in accordance with various embodiments.
Figure 3B:
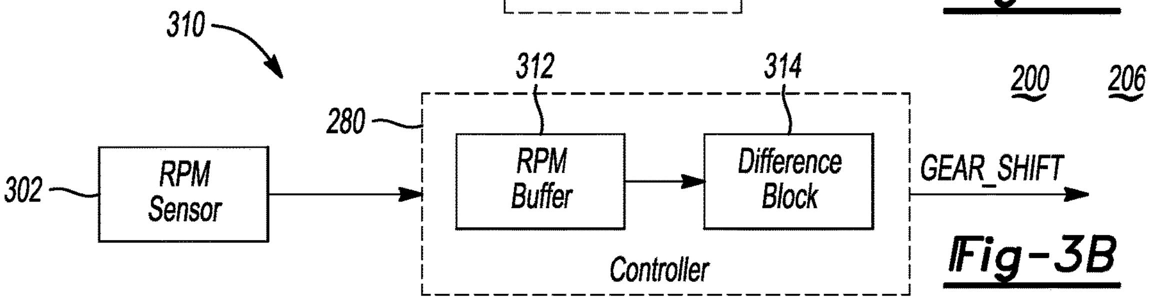
Figure 3C:
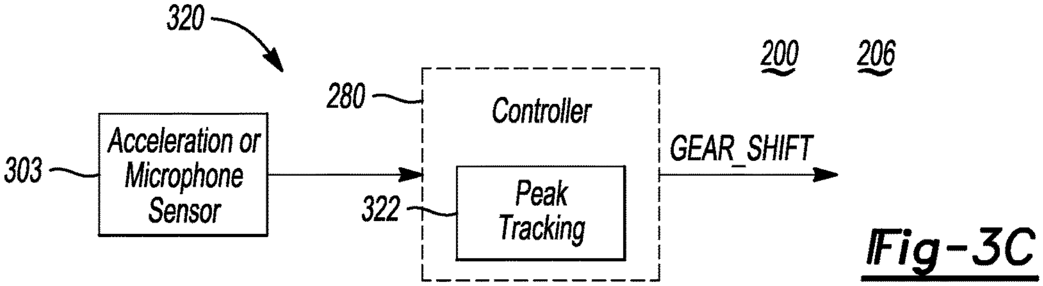

FIGS. 3A-3C depict various apparatuses 300, 310, 320 for accurately detecting gear shifts, despite noise in the RPM signal, in a vehicle accordance with various embodiments. Any of the various apparatuses 300, 310, and 320 may be used in connection with the ANC system 200 (or the EOC system 206). The apparatuses 300, 310, and 320 are generally configured to detect a sudden shift in the RPM signal.

Referring to FIG. 3A, the apparatus 300 includes an RPM sensor 302 and the controller 280. The RPM sensor 302 may be implemented as the engine speed or crank pulse sensor or the like 242. The controller 280 includes a sliding average block 304. The controller 280 receives the RPM signal from the RPM sensor 302 and the sliding average block 304 computes both a short-term and a long-term circular buffer average.

If the controller 280 determines that these two averages differ by more than a predetermined threshold, then the controller 280 detects that a gear shift has occurred. The predetermined threshold may be set to prevent false detections from ordinary or rapid vehicle acceleration. In other words, the threshold may be set so as not to improperly characterize fast acceleration as a gear shift. For example, a fast vehicle can accelerate up to 2000 RPM in 2 seconds, but the signal output during those 2 seconds of acceleration has continuously increasing values. A gear shift, by contrast, is a discontinuous event, where over the duration of the 50 ms to 400 ms shift, the RPM values suddenly change to a value ~2000 RPM higher or lower than the pre-shift value, and then resume the continuously varying behavior that occurred before the gear shift, as regular driving resumes.

Referring to FIG. 3B, the apparatus 310 includes the RPM sensor 302 and the controller 280. The controller 280 includes an RPM buffer 312 (e.g., memory) and a difference block 314. The controller 280 receives the RPM signal from the RPM sensor 302. The RPM buffer 312 stores a predetermined number of RPM values and an average of the values in the buffer is computed. The difference block 314 computes a difference between the buffer value and the current incoming RPM value from sensor 302. A difference computed by controller 280 greater than a predetermined threshold either instantaneously or over a period of time indicates that a gear shift has occurred. In an embodiment, the RPM buffer 312 can be a circular buffer.

Referring to FIG. 3C, the apparatus 320 includes an acceleration sensor (or accelerometer) or a microphone sensor 303 and the controller 280. The controller 280 includes a peak tracking block 322. The acceleration sensor 303 in this case may be positioned on the engine block of the vehicle. The microphone sensor 303 may have various positions, including being positioned in the passenger cabin, the engine compartment or near the exhaust system of the vehicle. The peak tracking block 322 may monitor the sensor output signal's peak frequencies, and when the controller 280 determines that the peak frequencies output from the sensor 303 have increased or decreased in frequency above a predetermined rate that may be set by a maximum acceleration or deceleration of the vehicle, the controller 280 determines that a gear shift has been detected.

In certain embodiments, shifts are detected by analyzing the highest prominent engine order frequency signal components output from the output of the accelerometer or microphone sensor 303, as there are more missed cycle peaks at a faster rate than in the lower orders. This aspect entails that a shift can be detected earlier, or there is time to perform some averaging to overcome noise inherent to these signals and gain more confidence in the shift detection. This aspect has the benefit of reducing false detections without adding latency.

During the gear shift, the engine torque decreases either because the clutch pedal is depressed, or an automatic transmission controller reduces the engine torque. The result of this decrease is a momentary reduction of engine and exhaust noise during the gear shift. This momentary reduction of noise indicates that it is not critical to the user experience to deliver high performance EOC during this time frame, because the engine noise has been reduced during this short window by the act of shifting gears, and the concomitant reduction in output torque. However, within a short time frame after the gear shift, when the new gear has been selected and is engaged, the engine torque increases again which increases the engine noise that is created. Therefore, for example, also within this short time after the gear shift, it is desirable to have high performance engine noise cancellation. In order to facilitate this aspect, the system 200 may need an accurate estimate of the engine RPM, which in this case is the post shift RPM.

Figure 4:
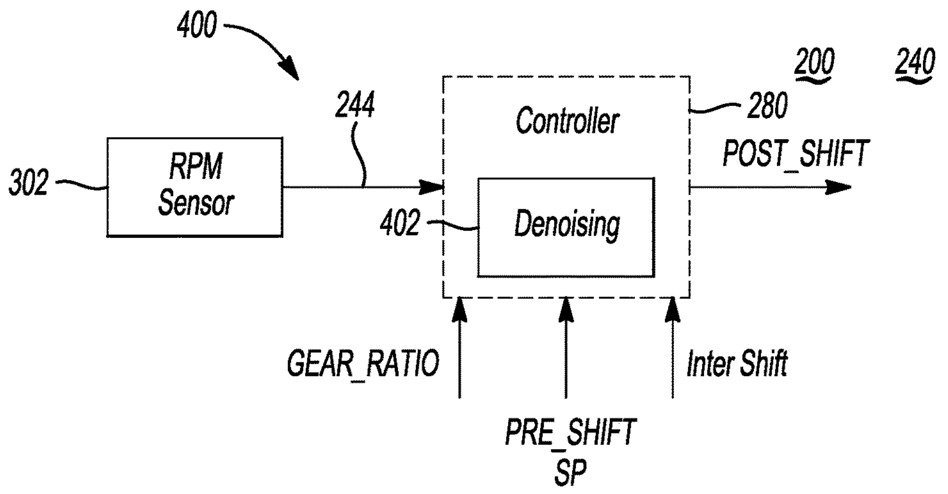
FIG. 4 depicts an apparatus for performing post-shift RPM detection for the ANC system of FIG. 2 in accordance with one embodiment.

FIG. 4 depicts an apparatus 400 for performing post-shift RPM signal generation for the ANC system of FIG. 2 in accordance with one embodiment. Due to the noise inherent in the RPM signal 244, and also the artifacts of the "missing teeth" in the RPM signal, current technology EOC systems typically employ some averaging on the RPM signal, which results in an undesirable latency in delivering the RPM estimate to the LUT 246, via the controller 280. That is, any type of smoothing or averaging that is applied to the RPM signal 244 may require some time to implement, which results in a delay of the RPM signal 244 before reaching the LUT 246, during which time, the engine RPM may have changed. Therefore, this latency decreases system performance, and should be minimized. However, such latency minimization by eliminating the RPM signal averaging or smoothing is also undesirable because the RPM signal does have some noise therein and delivering an incorrect estimate of the RPM to the LUT 246 may also result in decreased noise cancellation performance.

The apparatus 400 includes the controller 280 and the RPM sensor 302. In general, for EOC to converge and achieve optimal noise cancellation, a guiding signal at the correct RPM needs to be input to the controller 280. The controller 280 includes a denoising block 402 to eliminate any artifacts from the RPM signal, including those of the "missing teeth" or from the ordinary noise inherent to the RPM signal. To achieve, for example, the best post shift noise cancellation, an accurate, denoised RPM signal is to be delivered with a minimum latency. The aforementioned typical averaging employed by current EOC systems may be suboptimal. This is because a circular buffer used for denoising the signal is partially filled with RPM values from prior to the shift, or during the shift. These values should be eliminated from the buffer or other averaging technique, to provide a more accurate post gear shift RPM estimate. In addition to, or alternatively, the controller 280 may also receive signals corresponding to gear ratio, pre-shift speed, and inter-shift speed to estimate a post shift RPM even before the engine is operating at that RPM. Based on the gear shift ratio, pre-shift speed (or pre-shift engine speed), and the inter-shift engine speed, the controller 280 may be configured to predict the RPM that the engine is expected to transition to. In this case, the controller 280 may react faster to account for a rapidly changing RPM over the predetermined time interval and respond accordingly to cancel the engine noise at the RPM in question. For example, if the pre-shift (e.g., 4.71) and post-shift (3.14) gear ratios are input, then the post shift RPM equals the pre shift RPM (e.g., 5000) multiplied by the ratio of these (e.g., 3.14/4.71*5000=3333). This RPM may be slightly decreased by any inter-shift speed decrease, which can also be accounted for in step 280 to form the post shift estimate. Due to the dramatic decrease in torque during the shift event, the engine noise during the shift may not be as loud as just before the or after the shift. Based on the aspects noted above in connection with FIG. 4, it is possible to provide an improved estimate of the RPM signal 244.

As noted above in connection with FIG. 2, the LUT 260 includes a corresponding magnitude and phase to be used by the filter controller 110*b* to seed the adaptive filter 108/208 during moments in which the gear shift causes the engine's RPM to abruptly change. This aspect enables the EOC system 206 to converge at a quicker rate both during the gear shift and after the gear shift. The LUT 260 provides the corresponding magnitude and phase for each adaptive filter 208 of every engine order for an engine of the vehicle at each RPM. Both the magnitude and phase of the W-filters are adaptive in EOC. Due to the pre-seeding of the magnitude and phase for the adaptive filter(s) 208 based on such values in the LUT 260, this aspect may result in better noise cancellation immediately after a shift event occurs when compared to existing EOC systems. The corresponding magnitude and phase for the adaptive filter(s) 208 based on the post shift RPM value may be closer to target post-shift magnitude and phase than are the values present in current EOC systems (which is set by the pre-shift RPM Magnitude and phase), which has no relation to the post-shift magnitude and phase and may be tantamount to mere guessing. A benefit may be achieved if only one of the pre-seeded magnitude value or the pre-seeded the phase value are implemented in an embodiment. In addition, a benefit may be achieved by combining the current magnitude and phase with the pre-seeded magnitude and phase, as this aspect may also result in a magnitude and phase that are closer to the ideal values (i.e., the values that would result only after a delay to allow the adaptation process to complete). With current EOC systems, the phase may not be stored due to a missing absolute phase reference in the system. The aspect disclosed herein provides a phase reference which corresponds to the missing tooth signal feature in the RPM or crank pulse signal.

Based on the phase reference (e.g., the missing tooth characteristic of the crank position sensor), it is possible to pre-characterize the LUT 260 with a phase and magnitude for the RPM for engine order. After a shift event has occurred, and the post-shift RPM is determined, the "pre-seeding" value of magnitude and phase is pulled from the LUT 260 and used as the magnitude and phase value for the W-filter (or adaptive filter) 208. Predetermining the magnitude and phase requires a pre-characterization to take place. Predetermining the phase of the W-filter can take many forms, including operating the vehicle at a particular RPM for a period long enough to achieve full adaptation, and storing this phase value. The vehicle can then be operated at every target RPM value in the desired range, in every gear of the transmission. A similar process can be used to predetermine the magnitude of the W-filters. It is recognized that the magnitude of the W-filter depends on the speaker position, the microphone position and on an overall engine noise output level, which may be proportional to torque or engine pedal position at that instant. Under normal driving situations, the accelerator pedal position is proportional to the engine output torque. Note thought that when ascending a mountain, or when towing, the engine torque must be increased to achieve the same vehicle speed.

In an embodiment, the magnitude table predetermination involves creating a 3D LUT, where the additional dimension is pedal position or engine torque. In an embodiment, a 4D LUT can be created where the two additional dimensions are pedal position and torque. Populating such a table may involve operating the vehicle (or simulating operating the vehicle) over some or all of the range of RPM, Pedal and Torque while recording or estimating the target value of the adapted W-filter. In an embodiment, a 2D LUT of magnitude can be constructed, with a note of the engine torque value at the moment the data was taken. Then, at the time of retrieval, the magnitude value stored in the LUT may be scaled by the ratio of the engine torque at the time of retrieval and the pre-stored engine torque value. A benefit may be achieved even with this type of estimate of a ratio scaled w-filter magnitude based on the engine torque ratio. The better the estimated magnitude and phase, the faster the EOC system will converge to provide the maximum noise cancellation and the best user experience. The pre-seeded value of magnitude or phase may be entered into 208 at the start of a shift or at the end of a shift. Naturally this must be accompanied by the best estimate of the engine torque at the instant the values are preseeded. Preseeded values of magnitude and phase can be seeded into 208 for preadaptation for a predetermined period of time, or they may be directly entered into 108 for immediate use, and then be entered into 208 for continued adaptation.

Referring back to FIG. 2, the system 200 also optionally includes a shadow filter 262 that is present in the so-called Modified Fx-LMS, or MFXLMS system. As mentioned earlier, this shadow filter 262 may be used to preadapt the magnitude and phase values in W-filter 208 before use to generate antinoise by inserting their values into the adaptive filter 108. In an embodiment, shadow filter 262 can be used to preadapt magnitude and phase values from the LUT 260 that are close to the target to minimize adaptation time and improve EOC. In an embodiment, an EOC system with multiple shadow filters 262 may be pre-seeded with multiple variants of magnitude and phase coefficients from the LUT 260, and the optimal magnitude and phase coefficient from the LUT 260 can be identified as the set with the lowest gain error g[n]. This optimal set then can be used such that the filter controller 110 can copy the coefficients from 208 into the active, audible adaptive filter 108. One advantage of the shadow filter 262 in the MFxLMS system may include that the magnitude and phase of the W-filter (or adaptive filter) 108 can be adapted in this "side-branch" or shadow filter of the LMS system that is not the audible branch including the adaptive filter 108 that is generating the audible antinoise. The coefficients of the adaptive filter 208 (in the shadow filter) may be adapted, and then copied to the adaptive filter 108 for the generation of antinoise. The period of this adaptation and the frequency of copying the coefficients is adjustable. In the event the W-filter 208 in 262 diverges (i.e. as evidenced by a growing value of gain error g[n]), then its coefficients will simply not be copied to the audible branch 108. In various embodiments, multiple shadow filters 262 can be simultaneously adapted, having been pre-seeded with magnitude and phase values from the post-shift RPM table, and values surrounding the values in that LUT 260. This approach may be valuable in quickly determining the optimal value of the magnitude, in a case where a torque scaled w-filter magnitude is used.

The system 200 illustrates the manner in which the magnitude and phase values for the adaptive filter(s) 108 that are close to the desired target has a benefit to minimize adaptation time and improve EOC. The aspects disclosed herein provides a smart system that provides more than the conventional EOC system which is tantamount to "just guessing". In general, the real engines have non-ideal behaviors that can be accounted for. The cylinder firing in a real engine is electronically adjusted. In light of the aspect, it is desirable to provide a variable phase deviation between a crank angle and cylinder firing. The phase lead and lag may be known to an electronic engine control module (ECM) over a range for example, of approximately +/−30 degrees (e.g., of the 360 degrees) to compensate for an ideal air/fuel ratio or prevention of misfire. This angle offset may be supplied to the EOC system or to the controller 280 and be used as an offset to the pre-characterized phase value(s) of the LUT 260.

Dynamic skip fire (DSF) engines rapidly and frequently change the number and order of cylinders that fire, in order to conserve fuel. The aspects disclosed herein may be applicable to DSF engines. The cylinder firing for a DSF engine is still relative to an angle of the crank shaft, and so it is relative to the missing tooth on the output signal from the crank position sensor 242. In general, DSF engines have dominant engine orders that can dramatically change when the number of cylinders firing changes. This entails the engine order amplitudes can dramatically change as the number of cylinders firing changes, in an analogous manner to a gear shift. The various methods taught for detecting a gear shift and pre-seeding the magnitude and phase values for an EOC system are directly applicable to detecting a DSF engine configuration change and pre-seeding the magnitude and phase values of the W-filters for an EOC system. In other words, quickly adapting to a DSF engine firing configuration change also entails retrieval of the stored W-filter magnitude and phases from the LUT 260 corresponding to each new engine firing configuration.

Figure 5:
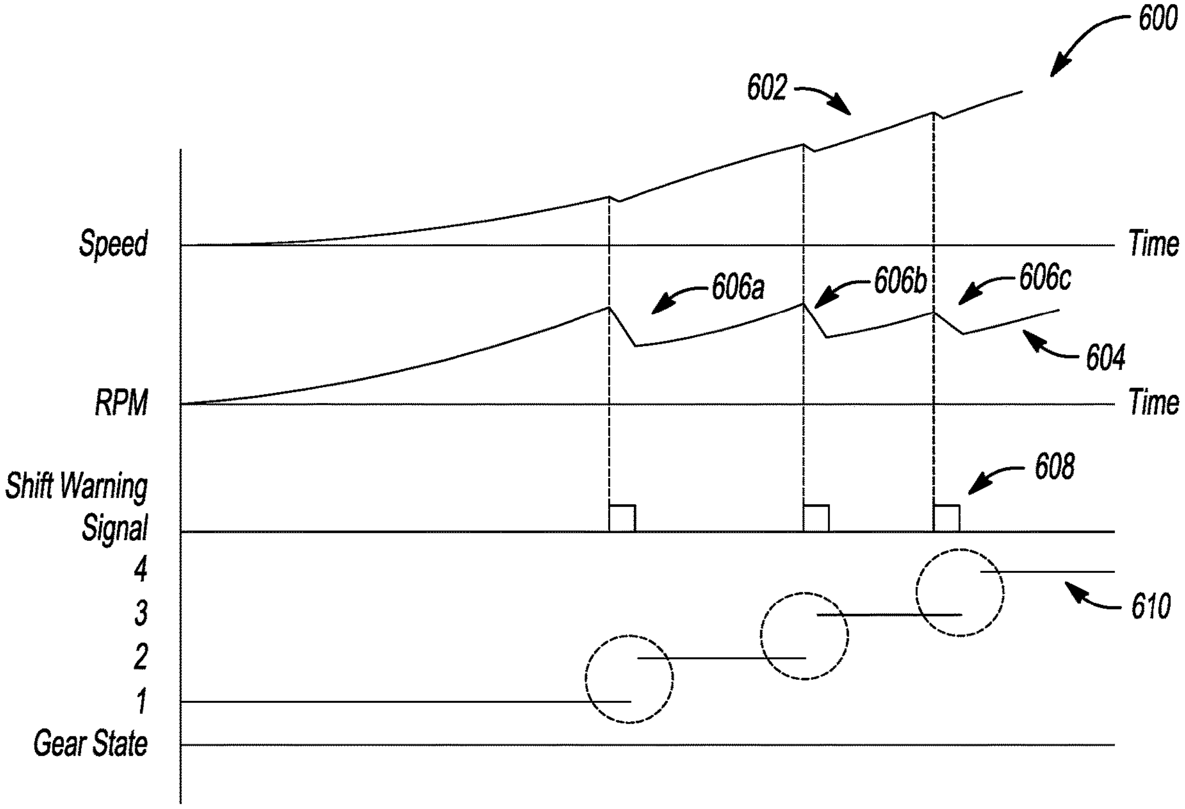
FIG. 5 depicts various plots corresponding to signals related to the ANC system(s) as disclosed herein in accordance with one embodiment.

FIG. 5 depicts various plots 600 corresponding to signals related to the ANC system(s) 200 as disclosed herein in accordance with one embodiment. Waveform 602 corresponds to vehicle speed and illustrates a change of such speed over time, as the vehicle accelerates from a stop. Waveform 604 corresponds to engine RPM and illustrates a change over time. The waveform 604 includes various peaks 606*a*, 606*b*, and 606*c* that correspond to the vehicle exhibiting gear shift events (e.g., shift for second gear, third gear, and forth gear). As readily seen at each of the peaks 606*a*-606*c*, the RPM exhibits a rapid drop and the starts to increase until the next gear shift is detected.

Waveform 608 generally corresponds to a shift detect signal that is indicative of a gear shift taking place. This shift detect signal (or gear shift signal) may be another possible signal that can be used to alert the smart EOC system that a shift is happening or occurring. This shift detect signal could be the output of the logic in controller 304 culminating in a shift_detect signal being generated. In addition, the shift detect signal may indicate that a new post-shift magnitude and phase value should be retrieved from the LUT 246. A powertrain controller (not shown) may transmit the shift detect signal over a controller arear network (CAN) bus or other digital data bus to the controller 280. Waveform 610 generally corresponds to a gear state signal that is indicative of a lag of engine RPM that can occur during a gear shift.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

For example, the steps recited in any method or process claims may be executed in any order and are not limited to the specific order presented in the claims. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing steps can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active noise cancellation (ANC) system comprising:

at least one loudspeaker to project anti-noise sound within a cabin of a vehicle based at least on an anti-noise signal;

at least one microphone to provide an error signal indicative of noise and the anti-noise sound within the cabin; and at least one controller programmed to:

receive the error signal and a reference signal indicative of a gear shift that occurs over a predetermined time interval; and adapt at least one adaptive filter with pre-stored filter coefficients for the predetermined time interval to generate the anti-noise signal based at least on the error signal and the reference signal.

2. The ANC system of claim 1, wherein the at least one controller is further programmed to adapt the at least one adaptive filter with the pre-stored filter coefficients based at least on a magnitude and a phase for an engine order for the vehicle.

3. The ANC system of claim 2, wherein the at least one controller is further programmed to adapt the at least one adaptive filter with the pre-stored filter coefficients based at least one the magnitude and the phase for engine revolutions per minute (RPM).

4. The ANC system of claim 3 further comprising memory being programmed to store a corresponding magnitude and phase for a corresponding RPM in a look up table (LUT).

5. The ANC system of claim 1, wherein the reference signal is further indicative of a change in engine revolutions per minute (RPM) of the vehicle over the predetermined time interval.

6. The ANC system of claim 1, wherein the reference signal includes at least information related to missing teeth on a reluctor ring associated with a crankshaft.

7. The ANC system of claim 6, wherein the at least one controller includes a denoising block to eliminate artifacts from the information related to the missing teeth.

8. The ANC of claim 1, wherein the at least one controller is further programmed to detect the gear shift over the predetermined time interval by one of:

(i) determining a long-term buffer average and a short-term buffer average based on a calculated sliding average of engine revolutions per minute (RPM) in response to the reference signal; and determining that the gear shift over the predetermined time interval has occurred in response to a difference between the long-term buffer average and the short-term buffer average being greater than a first predetermined threshold;

(ii) determining an average of a plurality of received RPM values;

computing a difference between the average of the plurality of received RPM values and an incoming RPM value; and determining that the gear shift over the predetermined time interval has occurred in response to the difference being greater than a second predetermined threshold; and (iii) receiving peak frequencies on the reference signal transmitted by one of an acceleration sensor or a microphone;

determining that the peak frequencies have one of increased and decreased relative to a predetermined rate as established by one of a maximum acceleration or deceleration of the vehicle; and determining that the gear shift over the predetermined time interval has occurred based on the peak frequencies have one of increased and decreased relative to the predetermined rate.

9. A method for performing active noise cancellation (ANC), the method comprising:

transmitting anti-noise sound within a cabin of a vehicle based at least on an anti-noise signal;

providing an error signal indicative of noise and the anti-noise sound within the cabin;

receiving, by at least one controller, the error signal and a reference signal indicative of a gear shift change that occurs over a predetermined time interval; and adapting at least one adaptive filter, via the at least one controller, with pre-stored filter coefficients for the predetermined time interval to generate the anti-noise signal based at least on the error signal and the reference signal.

10. The method of claim 9, further comprising adapting the at least one adaptive filter with the pre-stored filter coefficients based at least on a magnitude and a phase for an engine order for the vehicle.

11. The method of claim 10 further comprising adapting the at least one adaptive filter with the pre-stored filter coefficients based at least one the magnitude and the phase for engine revolutions per minute (RPM).

12. The method of claim 11 further comprising storing a corresponding magnitude and phase for a corresponding RPM in a look up table (LUT).

13. The method of claim 10, further comprising detecting the gear shift over the predetermined time interval by one of:

(i) determining a long-term buffer average and a short-term buffer average based on a calculated sliding average of engine revolutions per minute (RPM) in response to the reference signal; and determining that the gear shift over the predetermined time interval has occurred in response to a difference between the long-term buffer average and the short-term buffer average being greater than a first predetermined threshold;

(ii) determining an average of a plurality of received RPM values;

computing a difference between the average of the plurality of received RPM values and an incoming RPM value; and determining that the gear shift over the predetermined time interval has occurred in response to the difference being greater than a second predetermined threshold; and (iii) receiving peak frequencies on the reference signal transmitted by one of an acceleration sensor or a microphone;

determining that the peak frequencies have one of increased and decreased relative to a predetermined rate as established by one of a maximum acceleration or deceleration of the vehicle; and determining that the gear shift over the predetermined time interval has occurred based on the peak frequencies have one of increased and decreased relative to the predetermined rate.

14. The method of claim 9, wherein the reference signal is further indicative of a change in engine revolutions per minute (RPM) of the vehicle over the predetermined time interval.

15. The method of claim 9, wherein the reference signal includes a least information related to missing teeth on a reluctor ring associated with a crankshaft.

16. The method of claim 15, further comprising eliminating artifacts from the information related to the missing teeth.

17. A computer-program product embodied in a non-transitory computer readable medium that is programmed for performing active noise cancellation (ANC), the computer-program product comprising instructions being executable by at least one controller to:

transmit anti-noise sound within a cabin of a vehicle based at least on an anti-noise signal;

provide an error signal indicative of noise and the anti-noise sound within the cabin;

receive the error signal and a reference signal indicative of a gear shift change that occurs over a predetermined time interval; and adapt at least one adaptive filter, via the at least one controller, with pre-stored filter coefficients for the predetermined time interval to generate the anti-noise signal based at least on the error signal and the reference signal.

18. The computer-program product of claim 17 further comprising instructions executable by the at least one controller to adapt the at least one adaptive filter with the pre-stored filter coefficients based at least on a magnitude and a phase for an engine order for the vehicle.

19. The computer-program product of claim 18 further comprising instructions executable by the at least one controller to adapt the at least one adaptive filter with the pre-stored filter coefficients based at least one the magnitude and the phase for engine revolutions per minute (RPM).

20. The computer-program product of claim 17, wherein the reference signal includes a least information related to missing teeth on a reluctor ring associated with a crankshaft.

* * * * *